United States Patent
Ryu et al.

(10) Patent No.: US 11,962,022 B2
(45) Date of Patent: Apr. 16, 2024

(54) MINIATURIZED BATTERY MODULE AND BATTERY PACK HAVING THE SAME

(71) Applicant: HL Greenpower Inc., Chungju-si (KR)

(72) Inventors: Jae-Yeon Ryu, Chungju-si (KR); Gil-Sup Kim, Icheon-si (KR); Sung-Joo Kang, Chungju-si (KR); Jae-Nyeon Kim, Chungju-si (KR); Jin-Su Han, Chungju-si (KR); Jung-Hwan Kim, Chungju-si (KR)

(73) Assignee: HL GREENPOWER INC., Chungju-si (KR)

( * ) Notice: Subject to any disclaimer, the term of this patent is extended or adjusted under 35 U.S.C. 154(b) by 0 days.

(21) Appl. No.: 17/483,748

(22) Filed: Sep. 23, 2021

(65) Prior Publication Data

US 2022/0102799 A1 Mar. 31, 2022

(30) Foreign Application Priority Data

Sep. 29, 2020 (KR) .......................... 10-2020-0126723

(51) Int. Cl.
*H01M 50/209* (2021.01)
*H01M 10/48* (2006.01)
(Continued)

(52) U.S. Cl.
CPC ....... *H01M 50/209* (2021.01); *H01M 10/482* (2013.01); *H01M 10/613* (2015.04);
(Continued)

(58) Field of Classification Search
CPC .......................................... H01M 50/207–211
See application file for complete search history.

(56) References Cited

U.S. PATENT DOCUMENTS

2017/0222197 A1* 8/2017 Sawada ............... H01M 50/543
2019/0198952 A1 6/2019 Choi et al.
(Continued)

FOREIGN PATENT DOCUMENTS

EP 3584877 A1 12/2019
EP 3772124 A1 2/2021
(Continued)

OTHER PUBLICATIONS

KR20170094981A. Aug. 22, 2017. English machine translation by EPO. (Year: 2017).*

(Continued)

*Primary Examiner* — James Lee
(74) *Attorney, Agent, or Firm* — STIP Law Group, LLC

(57) ABSTRACT

Disclosed is a miniaturized battery module in which a space except for a space of a battery cell is minimized and the number of components is reduced. The miniaturized battery module includes a cell assembly configured by assembling a plurality of battery cells, an upper frame inserted into an outer upper surface of the cell assembly, a lower frame inserted into an outer lower surface of the cell assembly and fastened to the upper frame, and first and second endplates fastened to two opposite ends of the cell assembly and configured to fix the plurality of battery cells. In this case, at least two or more of the plurality of the battery cells are arranged side by side, and the upper frame and the lower frame are fastened by welding.

15 Claims, 6 Drawing Sheets

(51) Int. Cl.
    *H01M 10/613* (2014.01)
    *H01M 10/647* (2014.01)
    *H01M 10/6568* (2014.01)
    *H01M 10/658* (2014.01)
    *H01M 50/505* (2021.01)
    *H01M 50/574* (2021.01)

(52) U.S. Cl.
    CPC ..... *H01M 10/647* (2015.04); *H01M 10/6568* (2015.04); *H01M 10/658* (2015.04); *H01M 50/505* (2021.01); *H01M 50/574* (2021.01); *H01M 2220/20* (2013.01)

(56) References Cited

U.S. PATENT DOCUMENTS

2020/0176745 A1   6/2020   Lee
2021/0265696 A1*  8/2021   Ahn ..................... G01R 31/382

FOREIGN PATENT DOCUMENTS

| KR | 101029838 B1 | 4/2011 |
| KR | 20170094981 A | 8/2017 |
| KR | 20190112583 A | 10/2019 |
| KR | 20200104617 A | 9/2020 |

OTHER PUBLICATIONS

KR20190112583A. Oct. 7, 2019. English machine translation by EPO. (Year: 2019).*
The partial European search report of EP 21 19 9577, dated Mar. 24, 2022.
European Search Report of EP 21 19 9577, dated Aug. 17, 2022.

* cited by examiner

MINIATURIZED BATTERY MODULE AND BATTERY PACK HAVING THE SAME

CROSS-REFERENCE TO RELATED APPLICATION

This application claims priority to and the benefit of Korean Patent Application No. 10-2020-0126723 filed in the Korean Intellectual Property Office on Sep. 29, 2020, the entire contents of which are incorporated herein by reference.

TECHNICAL FIELD

The present disclosure relates to a battery module, and more particularly, to a miniaturized battery module, in which a space except for a space of a battery cell is minimized and the number of components is reduced, and a battery pack having the same.

BACKGROUND ART

A battery module for an electric vehicle is increasingly evolving. More battery cells are intended to be applied to a limited space to ensure a traveling distance. Therefore, a size of the battery module needs to be minimized. Many companies are developing and mass-producing miniaturized battery modules.

In general, cartridge type battery modules are used to apply battery modules with different shapes and different numbers of cells depending on types of vehicles. The application of the cartridge type battery module increases the number of components applied to the battery module, and many injection-molded components are used. Therefore, a size of the battery module is greatly increased in comparison with a size of the battery cell, which causes a problem that the number of stacked battery cells is limited.

In addition, because the battery cell is indirectly cooled by a cooling plate (made of aluminum (Al)) disposed between the battery cell and a cooling line, which causes a deterioration in cooling performance.

In addition, the cartridge and the cooling plate are applied for every one or two battery cells, which causes a problem of increase in the number of components.

SUMMARY

The present disclosure has been made in an effort to solve the problems in the related art, and an object of the present disclosure is to provide a miniaturized battery module, in which a space except for a space of a battery cell is minimized and the number of components is reduced, and a battery pack having the same.

Another object of the present disclosure is to provide a miniaturized battery module capable of improving cooling performance without using an indirect cooling method, and a battery pack having the same.

To achieve the above-mentioned object, the present disclosure provides a miniaturized battery module in which a space except for a space of a battery cell is minimized and the number of components is reduced.

The miniaturized battery module may include: a cell assembly configured by assembling a plurality of battery cells; an upper frame inserted into an outer upper surface of the cell assembly; a lower frame inserted into an outer lower surface of the cell assembly and fastened to the upper frame; and first and second endplates fastened to two opposite ends of the cell assembly and configured to fix the plurality of battery cells.

In this case, at least two or more of the plurality of the battery cells may be arranged side by side, and the upper frame and the lower frame may be fastened by welding.

In addition, the miniaturized battery module may include a cover top plate inserted to implement insulation between upper portions of the plurality of battery cells and the upper frame.

In addition, the miniaturized battery module may include a connection wire fixed to the first endplate and the second endplate.

In addition, a fixing hole may be formed in an inner surface of the cover top plate to fix the connection wire.

In addition, the connection wire may have a "⌐⌐" shape so as to be fastened to upper portions of ends of the first and second endplates.

In addition, the cover top plate may have a "⌐⌐" shape so as to be fastened to end surfaces of the first and second endplates.

In addition, the upper frame may have a cross-section with a "⌐⌐" shape, lower portions of two opposite sides of the upper frame may each have a stepped portion so as to be recessed inward, and a plurality of hooks may be formed on the lower portions of the two opposite sides of the upper frame so as to be fastened to the lower frame for welding.

In addition, a plurality of hook fasteners may be formed on a lateral surface of the lower frame so that the plurality of the hooks is seated on the plurality of hook fasteners for welding.

In addition, a bottom portion of the lower frame may have a ladder shape having opening holes opened to discharge heat generated from the cell assembly.

In addition, an insulation coating layer for insulation may be formed on an upper surface of the bottom portion.

In addition, elastic pads for compensating for surface pressure or swelling may be installed on at least one of a portion between the two battery cells arranged side by side, a portion between the battery cell and the upper frame, and a portion between the battery cell and the lower frame.

In addition, a gap filler layer may be formed to fill a space between the projections formed under the lower portions of the two battery cells arranged side by side.

In addition, adhesive parts may be attached to surfaces of the plurality of battery cells.

In addition, the endplates may each include: a body; a connection busbar installed in a fastening groove formed in a front surface of the body; a welding bar welded to be fixed on one end of the upper frame; and a voltage sensing board electrically connected to the connection busbar.

In addition, a shape of the fastening groove may match a shape of an end of the cover top plate.

In addition, a fixing hole may be formed in an upper portion of the body, and an end of the connection wire may be fixedly inserted into the fixing hole.

In addition, the voltage sensing board may include a short-circuit pattern configured to be short-circuited when abnormal voltage occurs, and the short-circuit pattern may have a wavy shape having a narrower width than other portions.

Another exemplary embodiment of the present disclosure provides a battery pack including: a plurality of miniaturized battery modules disclosed above; and a cooling line through which a coolant circulates to directly cool the plurality of the miniaturized battery modules, in which a gap filler layer is formed to fill gaps between projections formed on lateral lower portions of the two battery cells arranged side by side and the cooling line.

According to the present disclosure, since the standardized battery module is applied, the space except for the space of the battery cell may be minimized, and the number of components may be reduced by 60% to 80%.

In addition, according to another effect of the present disclosure, since the standardized battery module is applied, the number of stacked modules may be changed depending on types of vehicles, which makes it possible to reduce costs.

In addition, according to still another effect of the present disclosure, the after-sales service (A/S) may be performed for each battery module, which makes it possible to reduce A/S costs.

In addition, according to yet another effect of the present disclosure, since the size of the battery module is minimized, the cells may be additionally stacked in the same area, which makes it possible to increase a traveling distance.

DETAILED DESCRIPTION

Figure 1:
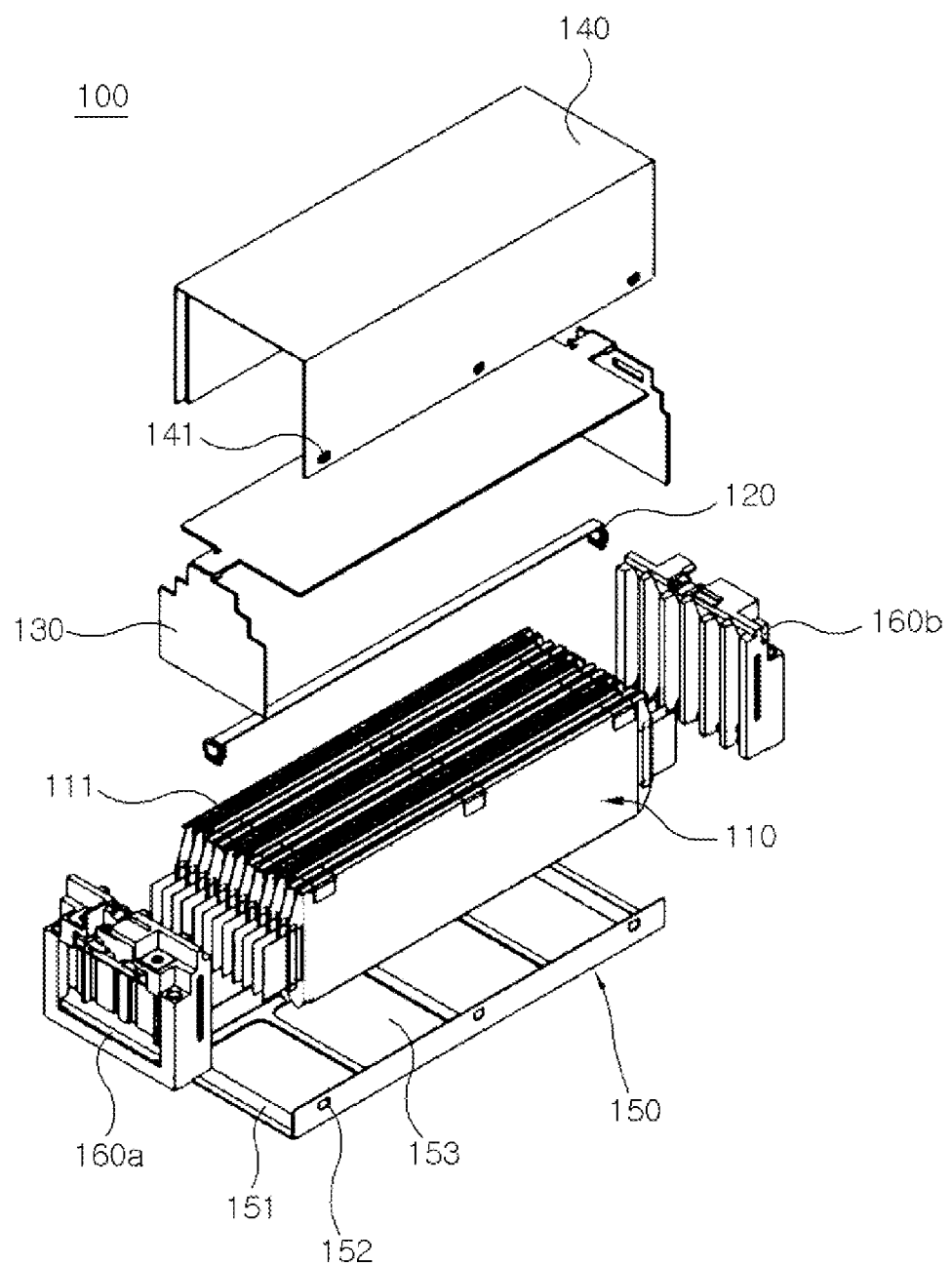
FIG. 1 is a perspective view illustrating an assembled battery module according to an embodiment of the present disclosure.

The present disclosure may be variously modified and may have various embodiments, and particular embodiments illustrated in the drawings will be specifically described below. However, the description of the exemplary embodiments is not intended to limit the present disclosure to the particular exemplary embodiments, but it should be understood that the present disclosure is to cover all modifications, equivalents and alternatives falling within the spirit and technical scope of the present disclosure.

In the description of the drawings, similar reference numerals are used for similar constituent elements. The terms such as "first" and "second" may be used to describe various constituent elements, but the constituent elements should not be limited by the terms. These terms are used only to distinguish one constituent element from another constituent element.

For example, a first component may be named a second component, and similarly, the second component may also be named the first component, without departing from the scope of the present disclosure. The term "and/or" includes any and all combinations of a plurality of the related and listed items.

Unless otherwise defined, all terms used herein, including technical or scientific terms, have the same meaning as commonly understood by those skilled in the art to which the present disclosure pertains.

The terms such as those defined in a commonly used dictionary should be interpreted as having meanings consistent with meanings in the context of related technologies and should not be interpreted as ideal or excessively formal meanings unless explicitly defined in the present application.

Hereinafter, a miniaturized battery module and a battery pack having the same according to an embodiment of the present disclosure will be described in detail with reference to the accompanying drawings.

FIG. 1 is a perspective view illustrating an assembled battery module 100 according to an embodiment of the present disclosure. Referring to FIG. 1, the battery module 100 includes a cell assembly 110, an upper frame 140 inserted into an outer upper surface of the cell assembly 110, a lower frame 150 inserted into an outer lower surface of the cell assembly 110 and fastened to the upper frame 140, and endplates 160a and 160b fastened to two opposite ends of the cell assembly 110.

The cell assembly 110 includes a plurality of assembled battery cells 111, and the endplates 160a and 160b are disposed on the two opposite ends of the cell assembly 110. The battery cell may be a high-voltage battery for an electric vehicle, such as a nickel-metal battery, a lithium-ion battery, or a lithium-polymer battery. In general, the high-voltage battery refers to a battery used as a power source for operating an electric vehicle. The high voltage is 100 V or higher. However, the present disclosure is not limited thereto, and a low-voltage battery may be used. The battery cells may be classified into pouch-type battery cells, cylindrical battery cells, angular battery cells, and the like depending on types of exterior materials. In the embodiment of the present disclosure, the pouch-type rechargeable battery cell may be used.

Twelve battery cells 111 may be used. However, twenty-four battery cells 111 may be applied. In addition, 1P, 2P, 3P, and 4P may be applied. In this case, P means parallel. An insulation pad is disposed between the battery cells.

The upper frame 140 is inserted into the outer upper surface of the cell assembly 110. To this end, the upper frame 140 has a cross-section with a "⌐¬" shape. Of course, a stepped portion is formed at a lateral lower side of the upper frame 140, such that the lateral lower side of the upper frame 140 is recessed inward. In addition, hooks 141 are disposed on the stepped portion.

The lower frame 150 is fastened to the stepped portion of the upper frame 140. To this end, hook fasteners 152 are disposed on a lateral surface of the lower frame 150 so that the hooks 141 are seated on the hook fasteners. In addition, a bottom portion of the lower frame 150 has opening holes 153 opened to discharge heat generated from the cell assembly 110. The bottom portion of the lower frame 150 has a ladder shape.

The upper frame 140 and the lower frame 150 each are mainly made of aluminum (Al) or steel, but engineering plastic may be applied. In addition, the upper frame 140 and the lower frame 150 each have a thickness of about 0.6 t to 2 t. In this case, t is 1 mm.

In addition, an insulation coating layer 151 is provided on an upper surface of the bottom portion of the lower frame 150. The insulation coating layer 151 may be formed by applying insulation paint or attaching a polycarbonate (PC) film, a polyethylene terephthalate (PET) film, a polyethylene naphthalate (PEN) film, a polypropylene (PP) film, or the like. Alternatively, an injection-molded material may be applied.

A connection wire 120 is fixed to the first endplate 160*a* and the second endplate 160*b*. In more detail, the connection wire 120 plays a role in holding the first endplate 160*a* and the second endplate 160*b*. The connection wire 120 may have a "⌐¬" shape and be mainly made of a metallic material. Of course, a non-metallic material may also be used.

Fixing grooves (not illustrated) may be formed respectively in both inner surfaces facing each other in a cover top plate 130 to fix the connection wire 120.

The cover top plate 130 is disposed above the plurality of battery cells 111 to implement the insulation between upper portions of the plurality of battery cells 111 and the upper frame 140. Of course, the upper frame 140 is assembled with an upper portion of the cover top plate 130.

In addition, the cover top plate 130 has a "⌐¬" shape and is fastened to an end surface of the first endplate 160*a* and an end surface of the second endplate 160*b*. The cover top plate 130 may be mainly made of a metallic material. Of course, a non-metallic material may also be used.

A semi-module may be implemented by the cover top plate 130 and the connection wire 120. In more detail, it is not necessary to fixedly fasten the first endplate 160*a* and the second endplate 160*b* with a long bolt. In addition, it is not necessary to fixedly fasten the first endplate 160*a* and the second endplate 160*b* to the cell assembly 110.

The first endplate 160*a* may be a front endplate, and the second endplate 160*b* may be a rear endplate.

Figure 2:
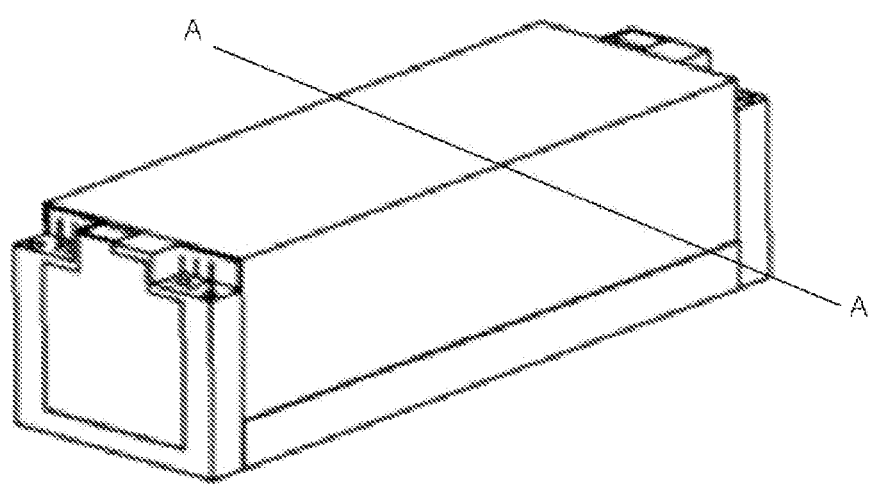
FIG. 2 is a perspective view illustrating an external appearance of the battery module illustrated in FIG. 1.

FIG. 2 is a perspective view illustrating an external appearance of the battery module 100 illustrated in FIG. 1. FIG. 2 is a perspective view illustrating an external appearance of the battery module 100 in which the components illustrated in FIG. 1 are assembled.

Figure 3:
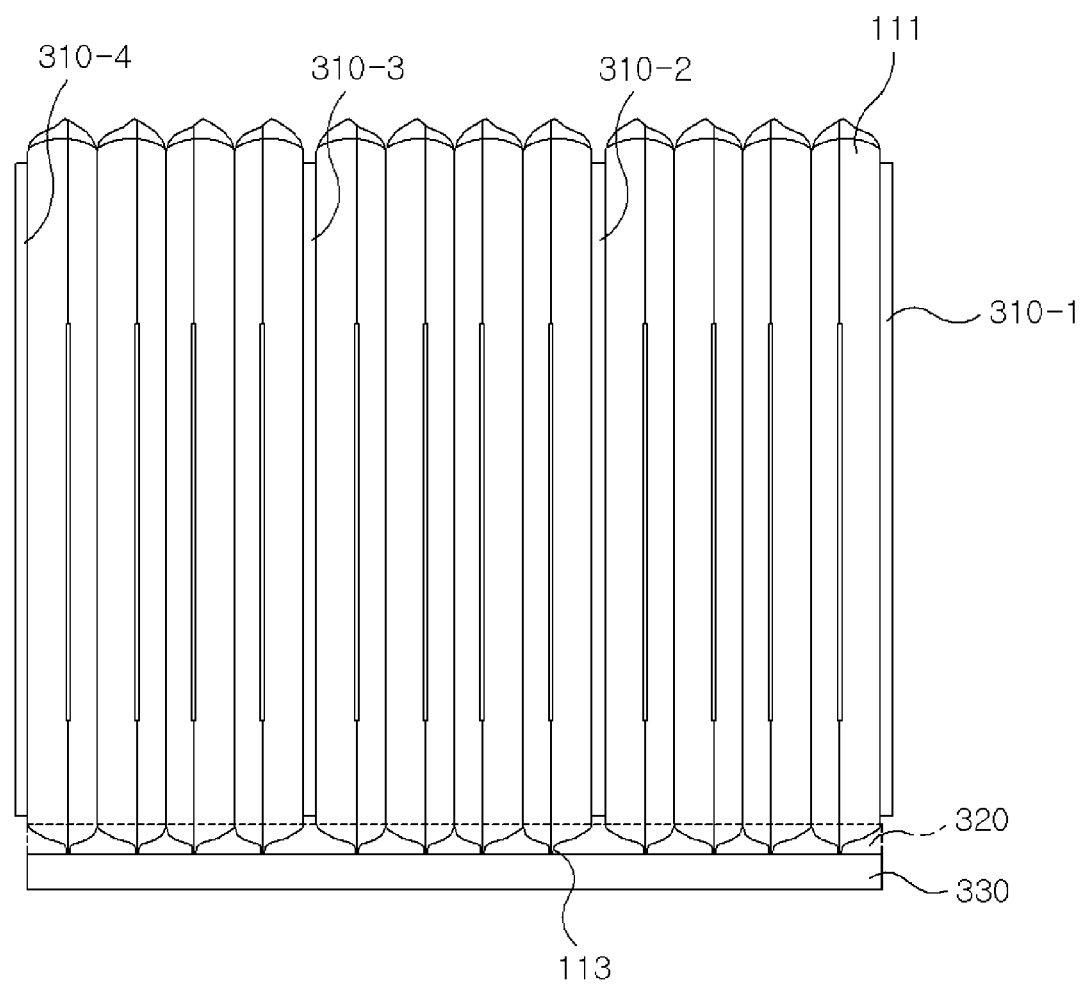
FIG. 3 is a cross-sectional view illustrating the battery module taken along line A-A in FIG. 2.

FIG. 3 is a cross-sectional view illustrating the battery module 100 taken along line A-A in FIG. 2. Referring to FIG. 3, first to third elastic pads 310-1, 310-2, and 310-3 are disposed between the battery cells 111 to compensate for surface pressure and/or swelling of the battery cells.

Of course, the first elastic pad 310-1 and a fourth elastic pad 310-4 may be also disposed between the battery cell 111 and the upper frame 140 and between the battery cell 111 and the lower frame 150 as well as between the battery cells 111. The second elastic pad 310-2 and the third elastic pad 310-3 are disposed between the battery cells.

The first to third elastic pads 310-1, 310-2, 310-3, and 310-4 may be made of sponge rubber such as polyurethane, polyethylene (PE), ethylene vinyl acetate (EVA), or chloroprene rubber (CR).

In addition, as the battery cells 111 are disposed vertically, the battery cells 111 have projections 113 protruding from the lower portions of the battery cells 111. Gaps may be formed between the battery cells and a cooling line 330 because of the presence of the by the projections 113. In this case, the cooling efficiency may deteriorate. Therefore, a gap filler layer 320 must be formed. The gap filler may be formed by a coating equipment. The gap filler layer 320 may be made of thermosetting two-part silicone (e.g., TC-4525 from Dow Corning) including alumina particles for thermal conduction. In more detail, the gap filler layer fills the space between the components to protect the respective components. The gap filler layer may also plays a role in bonding agent and serve to conduct heat and discharge heat. Therefore, the gap filler layer is formed as the material is applied and cured at room temperature.

Therefore, the battery cells 111 may be in close contact with the cooling line 330 for circulating a coolant, such that the cooling line 330 may directly cool the battery cells 111.

Of course, the upper frame 140 and the cover top plate 130 are omitted from the drawings to help understand the present disclosure.

Figure 4:
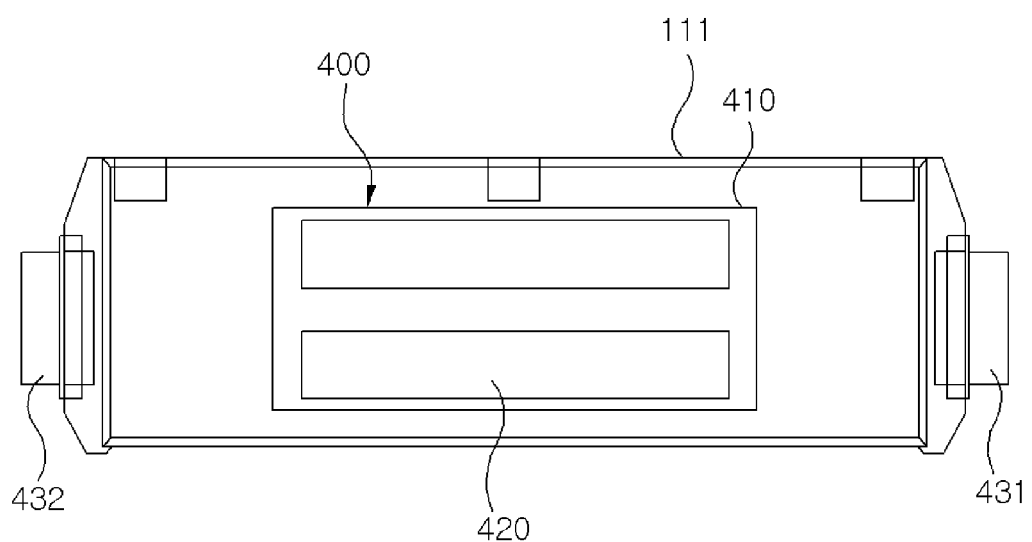
FIG. 4 is a front-side view illustrating a state in which an adhesive part is attached to a surface of a battery cell illustrated in FIG. 1.

FIG. 4 is a front-side view illustrating a state in which an adhesive part 400 is attached to a surface of the battery cell 111 illustrated in FIG. 1. Referring to FIG. 4, the adhesive part 400 includes a first sub-adhesive part 410 attached to a surface of one battery cell 111, and a second sub-adhesive part 420 provided to attach one battery cell 111 to another battery cell or another component. In this case, another component may be the frames 140 and 150 and the elastic pads 310-1 and 310-4. Cell lead tabs 431 and 432 are installed to both ends of the battery cell 111. The first sub-adhesive part 410 and the second sub-adhesive part 420 are spaced apart from each other at a predetermined interval. Of course, a double-sided tape or a hot-melt bonding agent may be used instead of the first sub-adhesive part 410 and the second sub-adhesive part 420.

Figure 5:
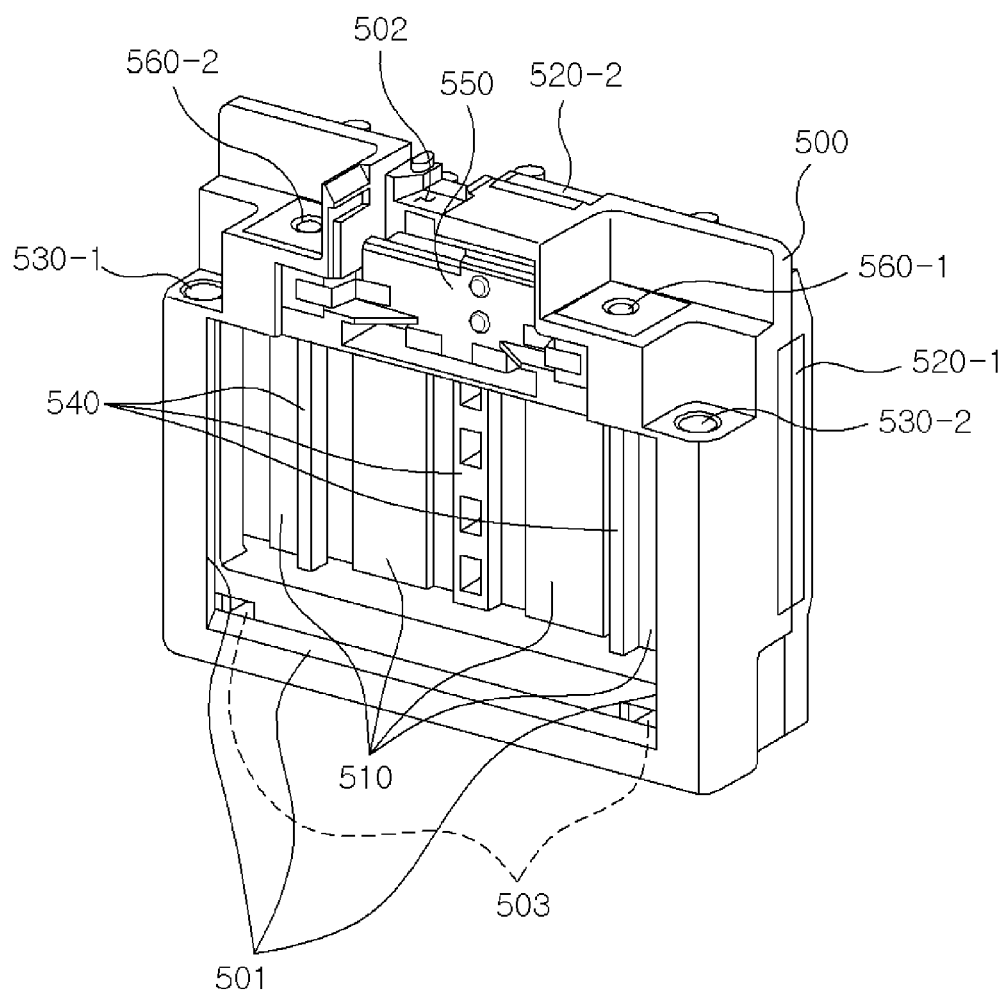
FIG. 5 is a front perspective view illustrating an endplate illustrated in FIG. 1.

FIG. 5 is a front perspective view of the endplate 160*a* or 160*b* illustrated in FIG. 1. Referring to FIG. 5, the endplate 160*a* or 160*b* may include a body 500, connection busbars 510 installed on a front surface of the body 500, welding bars 520-1 and 520-2 welded to both ends of the upper frame 140, and a voltage sensing board 550 electrically connected to the connection busbars 510.

A fastening groove 501 is formed in a front surface of the body 500, and one of the two opposite ends of the cover top plate 130 (see FIG. 1) is fastened to the fastening groove 501. The fastening groove 501 has a similar shape to the end of the cover top plate 130. That is, the fastening groove 501 is shaped such that the end of the cover top plate 130, which is bent at 90°, may be inserted and seated in the fastening groove 501. To strengthen the fastening, an auxiliary fastening groove 503 may also be additionally formed in an inner surface of the fastening groove 501. In this case, protruding portions (not illustrated) may be formed respectively on inner lateral surfaces of the 90° bent ends of the cover top plate 130 so as to insert into the auxiliary fastening groove 503.

The connection busbar 510 installed on an inner surface of the fastening groove 501 is in contact with cell lead tabs 431 and 432 of the battery cell 111. In addition, the connection busbar 510 is provided in plural, and insulation walls 540 are formed to separate the plurality of connection busbars 510. The connection busbars 510 may have different areas so as to be connected to serial/parallel configurations of the battery cells 111.

The first welding bar 520-1 is formed on a lateral surface of the body 500 so as to be welded to the upper frame 140, and the second welding bar 520-2 is also formed on an upper surface of the body 500 so as to be welded to the upper frame 140.

In addition, the voltage sensing board 550 is installed on an inner lateral surface of an upper portion of the fastening groove 501 and configured to sense the voltage and open or close a circuit. The voltage sensing board 550 is connected to the connection busbars 510 and may have a circuit for sensing the voltage, and a short circuit pattern for coping with a short circuit caused by the occurrence of abnormal voltage. Therefore, it is not necessary to use a fuse.

In addition, a fixing hole 502 is formed in an upper portion of the body 500 to fix the connection wire 120 with the fixing grooves in the cover plate 130. Of course, the fixing hole 502 has different widths and a stepped portion. The connection wire 120 having the "⌐¬" shape is fixed with the stepped portion formed on a front surface of the fixing hole 502.

Therefore, the cover top plate 130 covers the connection wire 120 in a state in which the connection wire 120 is inserted into the fixing holes 502.

In addition, mounting bushings 530-1 and 530-2 are provided on the body 500 to mount the battery module on a battery pack (not illustrated). In addition, terminal parts 560-1 and 560-2 are connected to the voltage sensing board 550.

Figure 6:
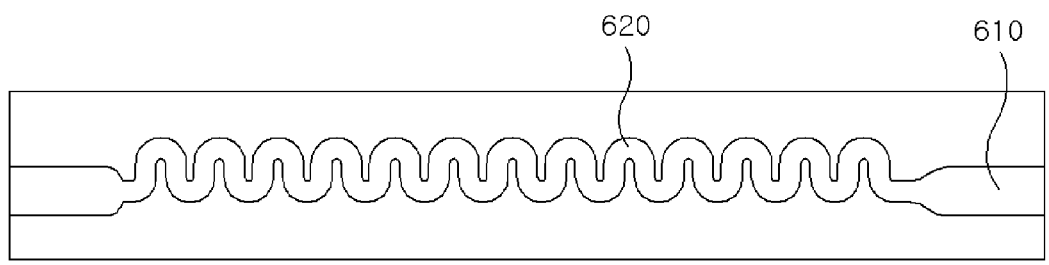
FIG. 6 is a view illustrating a short-circuit pattern circuit of a voltage sensing board illustrated in FIG. 5.

FIG. 6 is a view illustrating a short-circuit pattern circuit of the voltage sensing board illustrated in FIG. 5. Referring to FIG. 6, the short-circuit pattern 620 having a wavy shape is formed from both ends of the voltage sensing board 550. The voltage sensing board 550 on which the short-circuit pattern is formed is a flexible printed circuit board (FPCB). The short-circuit pattern 620 is the wavy shape having a narrower width than other portions of the short-circuit pattern circuit.

Figure 7:
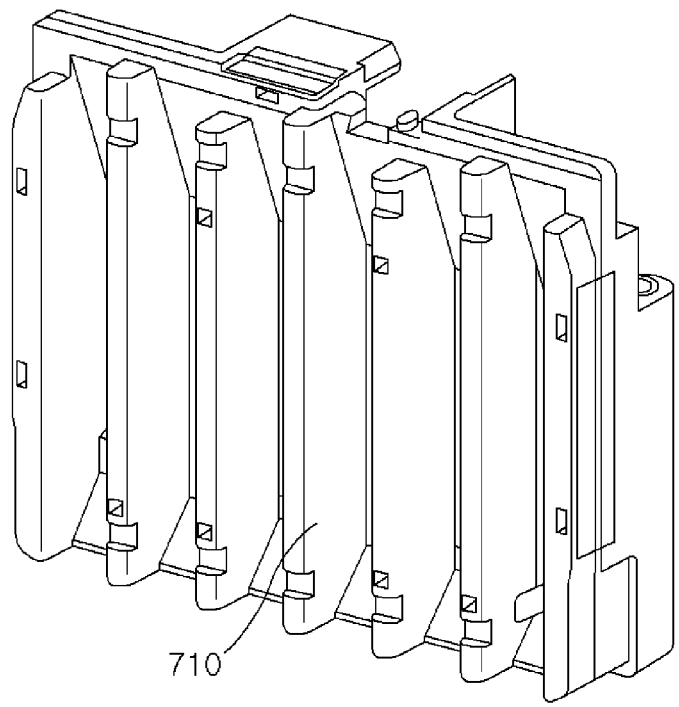
FIG. 7 is a rear perspective view illustrating the endplate illustrated in FIG. 5.

FIG. 7 is a rear perspective view of the endplate 160*a* or 160*b* illustrated in FIG. 5. Referring to FIG. 7, the endplate has insulation walls 710 that guide the cell lead so that the cell lead is inserted at the time of assembling the cell assembly 110. The insulation wall 710 serves to separate one cell lead from other cell leads.

What is claimed is:

1. A miniaturized battery module comprising:
   a cell assembly (110) configured by assembling a plurality of battery cells (111);
   an upper frame (140) inserted into an outer upper surface of the cell assembly (110), wherein the upper frame comprises a first two opposite sides, and the first two opposite sides are open;
   a lower frame (150) inserted into an outer lower surface of the cell assembly (110) and fastened to the upper frame (140);
   first and second endplates (160*a*, 160*b*) fastened to two opposite ends of the cell assembly (110) and configured to fix the plurality of battery cells (140); and
   a cover top plate (130) inserted to implement insulation between upper portions of the plurality of battery cells (111) and the upper frame (140);
   wherein,
   at least two or more of the plurality of battery cells (111) are arranged side by side in the cell assembly (110),
   the upper frame (140) and the lower frame (150) accommodate a semi-module fixing the first and second endplates (160*a*, 160*b*), wherein the semi-module comprises theft cover top plate (130) fixing the end surfaces of the first and second endplates (160*a*,160*b*) and a connection wire (120) fixed in an inner surface of the cover top plate (130),
   two opposite sides of the cover top plate (130) are each fastened to an end surface of the first endplate (160*a*) and an end surface of the second endplate (160*b*), respectively,
   each of the first two opposite sides has a front-view having a "⊓" shape and the upper frame (140) has a cross-section having a "⊓" shape, and
   the cover top plate (130) being a three-dimensional structure, has a cross-section having a "⊓" shape so as to be fastened to the end surfaces of the first and second endplates (160*a*,160*b*).

2. The miniaturized battery module of claim 1, wherein,
   a fixing groove is formed in the inner surface of the cover top plate to fix the connection wire.

3. The miniaturized battery module of claim 2, wherein the connection wire being a three-dimensional structure, has a cross-section having a "⊓" shape so as to be fastened to upper portions of ends of the first and second endplates.

4. The miniaturized battery module of claim 1,
   wherein the upper frame being a three-dimensional structure further comprises a second two opposite sides,
   lower portions of the second two opposite sides of the upper frame each have a stepped portion so as to be recessed inward, and
   a plurality of hooks are formed on the lower portions of the two opposite sides of the upper frame so as to be fastened to the lower frame for welding.

5. The miniaturized battery module of claim 4, wherein a plurality of hook fasteners is formed on a lateral surface of the lower frame so that the plurality of hooks is seated on the plurality of hook fasteners for welding.

6. The miniaturized battery module of claim 5, wherein a bottom portion of the lower frame has a ladder shape having opening holes opened to discharge heat generated from the cell assembly.

7. The miniaturized battery module of claim 6, wherein an insulation coating layer for insulation is formed on an upper surface of the bottom portion.

8. The miniaturized battery module of claim 1, wherein elastic pads for compensating for surface pressure or swelling are installed on at least one of a portion between the at least two or more of the plurality of the battery cells arranged side by side, a portion between a battery cell of the plurality of battery cells and the upper frame, and a portion between a battery cell of the plurality of battery cells and the lower frame.

9. The miniaturized battery module of claim 1, wherein a gap filler layer is formed to fill a space between projections formed under lateral lower portions of the at least two or more of the plurality of the battery cells arranged side by side.

10. The miniaturized battery module of claim 1, wherein adhesive parts are attached to surfaces of the plurality of battery cells.

11. The miniaturized battery module of claim 2, wherein the endplates each comprise:
    a body;
    a connection busbar installed in a fastening groove formed in a front surface of the body;
    a welding bar welded to be fixed on one end of the upper frame; and
    a voltage sensing board electrically connected to the connection busbar.

12. The miniaturized battery module of claim 11, wherein a shape of the fastening groove matches a shape of an end of the cover top plate.

13. The miniaturized battery module of claim 11, wherein a fixing hole is formed in an upper portion of the body, and an end of the connection wire is fixedly inserted into the fixing hole.

14. The miniaturized battery module of claim 11, wherein the voltage sensing board comprises a short-circuit pattern configured to be short-circuited when abnormal voltage occurs, and the short-circuit pattern has a wavy shape having a narrower width than other portions.

15. A battery pack comprising:
    a plurality of miniaturized battery modules according to claim 1; and
    a cooling line through which a coolant circulates to directly cool the plurality of the miniaturized battery modules, wherein a gap filler layer is formed to fill gaps between projections formed on lateral lower portions of the at least two or more of the plurality of the battery cells arranged side by side and the cooling line.

* * * * *